United States Patent
Sandri et al.

(10) Patent No.: US 7,428,732 B2
(45) Date of Patent: Sep. 23, 2008

(54) METHOD AND APPARATUS FOR CONTROLLING ACCESS TO SHARED RESOURCES IN AN ENVIRONMENT WITH MULTIPLE LOGICAL PROCESSORS

(75) Inventors: Jason Sandri, Gilbert, AZ (US); Steven Tu, Phoenix, AZ (US); Orlando Davila, Antibes (FR)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 10/001,961

(22) Filed: Dec. 5, 2001

(65) Prior Publication Data

US 2003/0105796 A1  Jun. 5, 2003

(51) Int. Cl.
G06F 9/46 (2006.01)
G06F 12/00 (2006.01)

(52) U.S. Cl. .................................. 718/104; 710/200
(58) Field of Classification Search ................ 710/240, 710/260, 200; 711/150; 718/104
See application file for complete search history.

(56) References Cited

U.S. PATENT DOCUMENTS

| | | | | |
|---|---|---|---|---|
| 4,354,227 A | * | 10/1982 | Hays et al. | 710/240 |
| 5,421,002 A | * | 5/1995 | Lee et al. | 714/43 |
| 5,544,353 A | * | 8/1996 | Forman et al. | 707/8 |
| 5,895,494 A | * | 4/1999 | Scalzi et al. | 711/150 |
| 6,795,901 B1 | * | 9/2004 | Florek et al. | 711/152 |
| 6,823,472 B1 | * | 11/2004 | DeKoning et al. | 714/10 |

* cited by examiner

*Primary Examiner*—Meng-Ai An
*Assistant Examiner*—Camquy Truong
(74) *Attorney, Agent, or Firm*—Kenyon & Kenyon LLP (57) ABSTRACT

The disclosure relates to a control mechanism for controlling access by multiple logical processors to shared resources on a common microchip. The processors attempt to reserve exclusive use of needed resources by updating a resource descriptor. The resource descriptor describes which logical processors have exclusive use of which resources. In order to update the resource descriptor, a logical processor must first obtain exclusive access to the resource descriptor by updating a semaphore.

13 Claims, 7 Drawing Sheets

| BIT POSITION | N | 1 | 0 |
|---|---|---|---|
| DESCRIPTION | LPID | LPID | LOCK |

106

| RESOURCE # | RESOURCE 2 (Y=2) | | RESOURCE 1 (Y=1) | | RESOURCE 0 | |
|---|---|---|---|---|---|---|
| BIT LOCATION | Y(N+1)+N | Y(N+1)+1 | Y(N+1) | Y(N+1)+N...+1 | N | 0 |
| DESCRIPTION | LPID | LPID | LOCK | LPID | LPID | LOCK |

| RESOURCE # | RESOURCE 2 (Y=2) | | RESOURCE 1 (Y=1) | | RESOURCE 0 | |
|---|---|---|---|---|---|---|
| BIT LOCATION | 5 | 3 | 2 | 4 | 1 | 0 |
| DESCRIPTION | LPID | LPID | LOCK | LPID | LPID | LOCK |

106.2

| RESOURCE # | RESOURCE 2 (Y=2) | | RESOURCE 1 (Y=1) | | RESOURCE 0 | |
|---|---|---|---|---|---|---|
| BIT LOCATION | 8 | 7 | 6 | 5 | 4 | 3 | 2 | 1 | 0 |
| DESCRIPTION | LPID | LPID | LOCK | LPID | LPID | LOCK |

106.3

| RESOURCE # | RESOURCE 2 (Y=2) | | RESOURCE 1 (Y=1) | | RESOURCE 0 | |
|---|---|---|---|---|---|---|
| BIT LOCATION | 11 | 9 | 8 | 7 | 5 | 4 | 3 | 1 | 0 |
| DESCRIPTION | LPID | LPID | LOCK | LPID | LPID | LOCK |

METHOD AND APPARATUS FOR CONTROLLING ACCESS TO SHARED RESOURCES IN AN ENVIRONMENT WITH MULTIPLE LOGICAL PROCESSORS

TECHNICAL FIELD

The present invention relates to multi-processor core or multi-threaded computer microchips, and more particularly to a method and apparatus for controlling access among multiple processor cores or multiple threads on a common microchip to shared resources.

BACKGROUND OF THE INVENTION

Advances in technology have permitted logic designs to be packed with increased density into smaller areas of silicon as compared with past integrated circuit devices. Moreover, as process technologies have shrunk feature sizes and the sophistication of chip design has increased, chip configurations have evolved from the basic single, central processor model to include two or more processor cores. Additionally, multi-threaded processors are becoming increasingly common.

Figure 7:
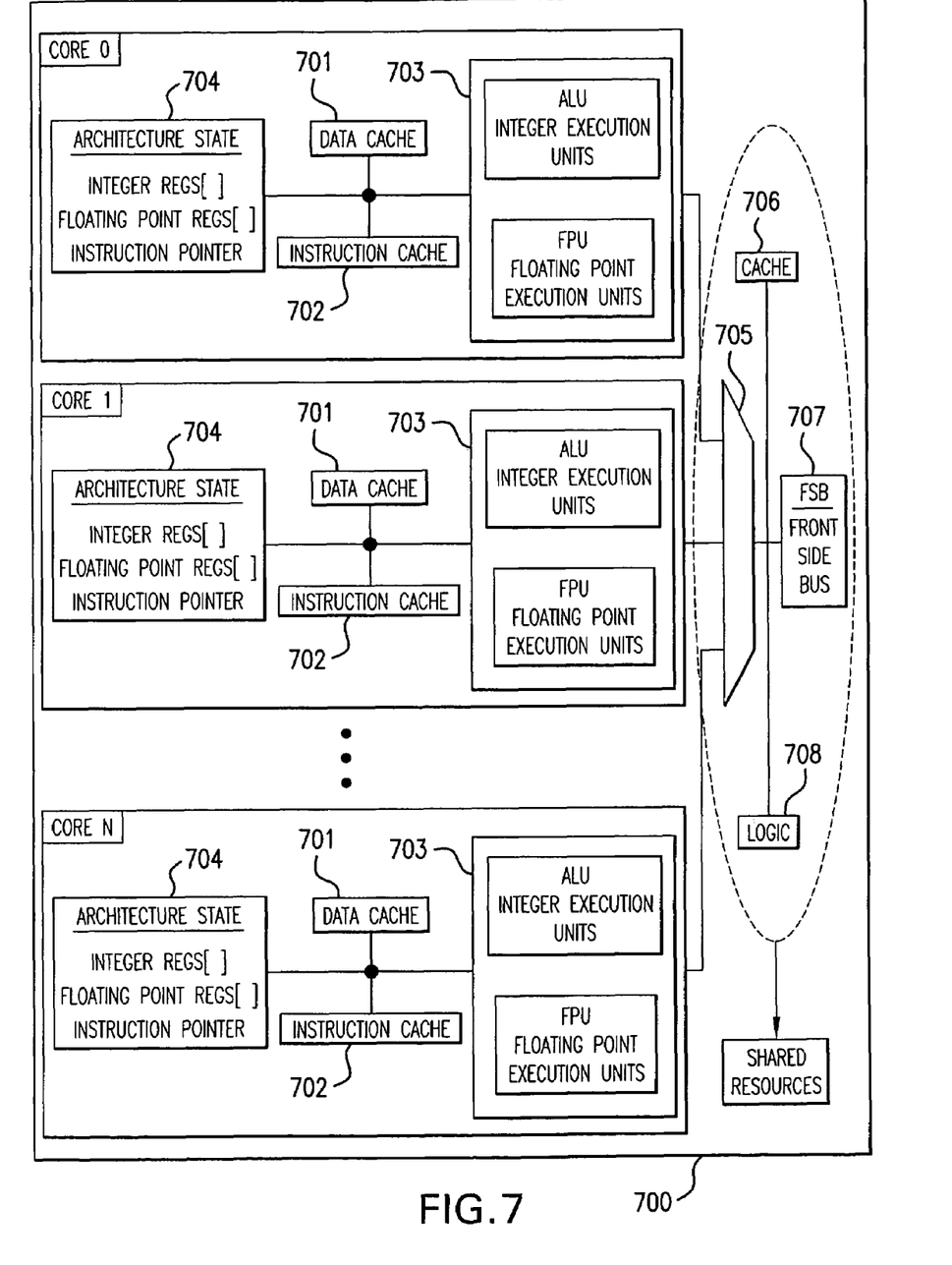
FIG. 7 is a block diagram of a multi-core microchip.

FIG. 7 shows an example of a microchip 700 including a plurality of processor cores. Each processor core, 0-N, comprises its own data cache 701, instruction cache 702, and ALU (arithmetic/logical unit) and FPU (floating point unit) execution units 703. Each processor core further has an architecture state 704. The architecture state includes the state of the instruction pointer, the state of all general registers, and other status information such as whether interrupts are enabled or disabled. In the context of execution threads, discussed in more detail below, the architecture state may thus be defined as all the information that is required to resume execution of an interrupted thread. A plurality of processor cores as shown in FIG. 7 typically share certain chip resources. For example, cores 0-N share cache 706, front side bus 707, and control logic 708 via multiplexer 705.

Figure 8:
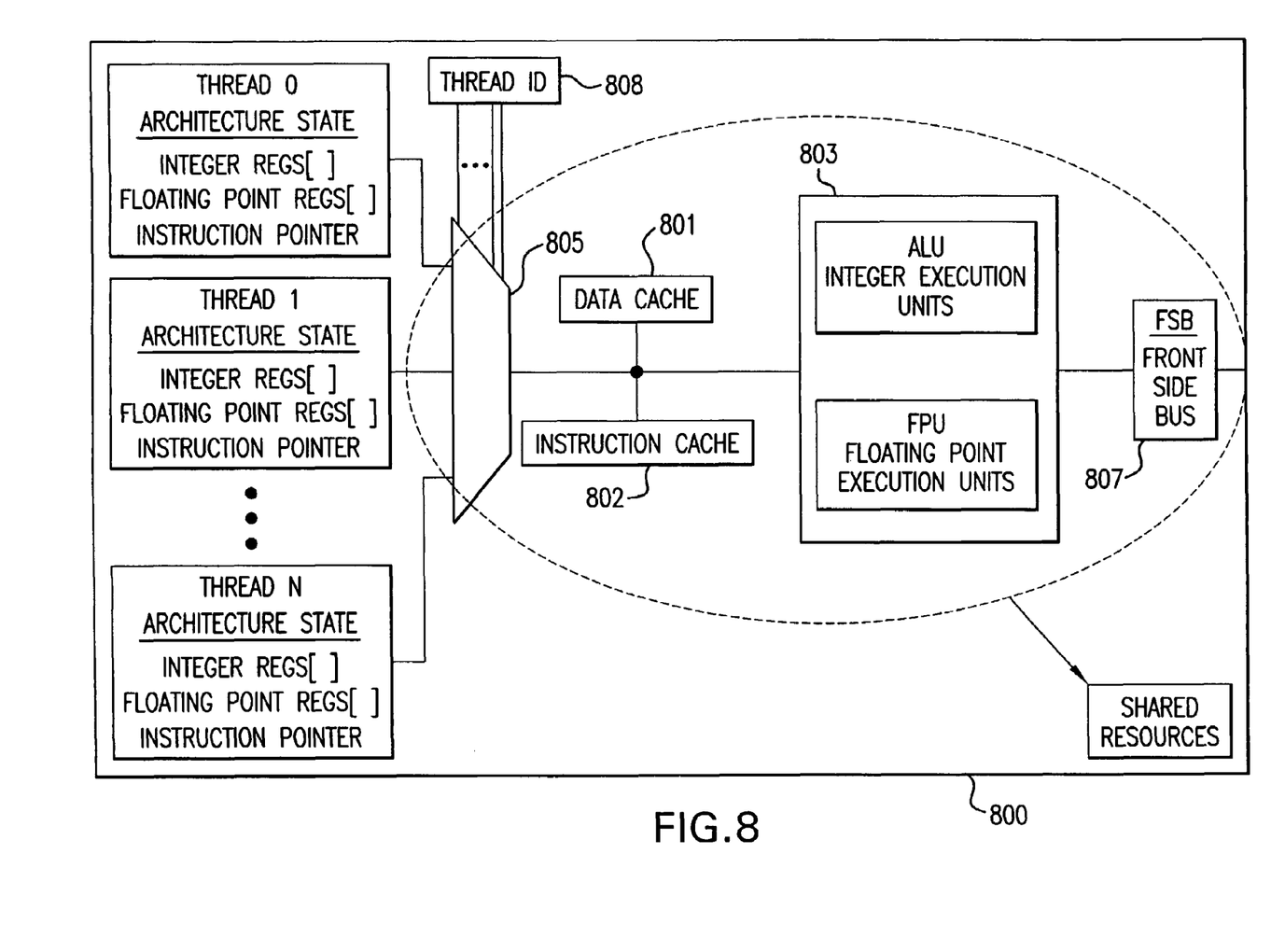
FIG. 8 is a block diagram of a multi-threaded microchip.

FIG. 8 shows an example of a microchip 800 including a plurality of execution threads, 0-N. Each thread corresponds to an architecture state. In contrast to the multi-core configuration of FIG. 7, the threads share a common data cache 801, instruction cache 802, and ALU and FPU execution units 803. The threads also share a front side bus 807. A thread identifier register 808 determines, via control inputs to multiplexer 805, which thread is currently executing.

To operating system software, chips 700 and 800 are functionally the same. That is, the operating system does not differentiate between a core and a thread; whether an operating system request for some processor service is being acted upon by a core or by a thread is transparent to the operating system.

Accordingly, as used herein, the term "logical processor" refers to either a processor core as shown in FIG. 7, or a thread as shown in FIG. 8.

The need to integrate the operations of multiple logical processors on a single silicon chip presents a range of challenges. One aspect of these challenges is the need to efficiently manage the shared resources, identified above, used by the respective types of logical processors. Shared resources are defined generally herein as those assets which are available to the different types of logical processors on the same silicon chip.

It should be understood by "shared" that while more than one logical processor may use the same resource, they generally should not do so concurrently. Thus, more than one logical processor may need a given resource at the same time, but only one logical processor can use it, while the others must wait their turn. The demand among a plurality of logical processors for the same resources requires control schemes to be implemented for managing possible access conflicts.

In the prior art, such control schemes have typically entailed the use of "semaphores." A semaphore, in the foregoing context, is a data field, usually in a register, that contains information signaling that a particular logical processor of a plurality of logical processors has exclusive use of a shared resource. A logical processor with exclusive use of a resource may be said to have a "lock" on the resource.

In one known semaphore mechanism, each shared resource has its own guarding semaphore. Such a mechanism suffers from the inherent disadvantage that, if a logical processor requires multiple shared resources, it must serially determine, via each guarding semaphore, the availability of each of the required resources to attempt to obtain a lock on all of the resources. The availability of the required resources may change while the logical processor is attempting to make this determination. If the logical processor cannot obtain a lock on all the resources it needs, it must release the locks on the resources that it was able to obtain. This can lead to a counterproductive condition known as "thrashing," wherein a number of logical processors are repeatedly contending for resources, but no single logical processor is able to obtain all the resources it needs and therefore no forward progress is made.

In another known semaphore mechanism, a global semaphore is used which locks all available resources for the exclusive use of the logical processor that is able to obtain the lock. However, this approach is inefficient in that all logical processors do not necessarily have overlapping resource needs. Therefore, it could be possible for a plurality of logical processors to use some resources in parallel. A global semaphore lock obviates this possibility.

Typically, once a logical processor with a semaphore lock on a resource no longer needs the resource, it releases the lock so that other logical processors can use it. However, another undesirable condition that can occur in the use of semaphores is that a logical processor that has obtained a lock may "go bad"; i.e., suffer some kind of hardware or software failure that causes it to retain the lock for an indefinite period of time. This condition, sometimes referred to as "livelock," can also arrest all forward progress among other logical processors. One aspect of known semaphore mechanisms that makes such a problem difficult to resolve is that only the locking logical processor can release the lock.

An approach is needed to address the concerns noted in the foregoing.

DETAILED DESCRIPTION

Embodiments of the present invention as described hereinafter overcome the above-described drawbacks in the prior art. According to the embodiments, access by a plurality of logical processors to shared resources in a logic device may be controlled with a semaphore and a resource descriptor. A first logical processor may update the semaphore in order to obtain exclusive access to the resource descriptor (referred to hereinafter as "obtaining the semaphore lock"). The resource descriptor describes a usage allocation of the shared resources: i.e., it identifies those resources, if any, that are reserved for exclusive use by a particular logical processor, and those resources, if any, that are available.

Once exclusive access to the resource descriptor is obtained, the first logical processor may query the resource descriptor to determine whether the resource or resources it needs are available. If the resource or resources are available, the first logical processor may update the resource descriptor to reserve the resource or resources for its exclusive use, and then release its exclusive access to the resource descriptor by releasing the semaphore lock. The first logical processor may then freely use the resource or resources it reserved via the resource descriptor.

Meanwhile, since the first logical processor now no longer has exclusive access to the resource descriptor, a second logical processor may reserve the resource descriptor for its exclusive use by obtaining the semaphore lock. Like the first logical processor, the second logical processor may query the resource descriptor to determine whether the resource or resources it needs are available. If the resource or resources are available, the second logical processor may update the resource descriptor to reserve the resource or resources for its exclusive use, and then release its exclusive access to the resource descriptor by releasing the semaphore lock. The second logical processor may then freely use the resource or resources it reserved via the resource descriptor.

Similarly, a third, or fourth, or N-th logical processor in a device with N logical processors may then attempt to reserve the resource or resources it needs by the above-described process.

It may be appreciated that the process avoids the problem of inefficient usage of shared resources that occurs in a mechanism which uses a global semaphore as described above in the background discussion. Instead, shared resources are used efficiently since, if the resource or resources they need are respectively available, a plurality of logical processors may use the resources concurrently.

Also, the problem of "thrashing" is eliminated since, rather than having to serially obtain locks on semaphores for individual resources, a logical processor can instead obtain a lock via the semaphore to the resource descriptor. Then, the logical processor can determine whether all the resources it needs are available, and if so, reserve all of them, by querying and updating a single data field, i.e., the resource descriptor.

Figure 1:
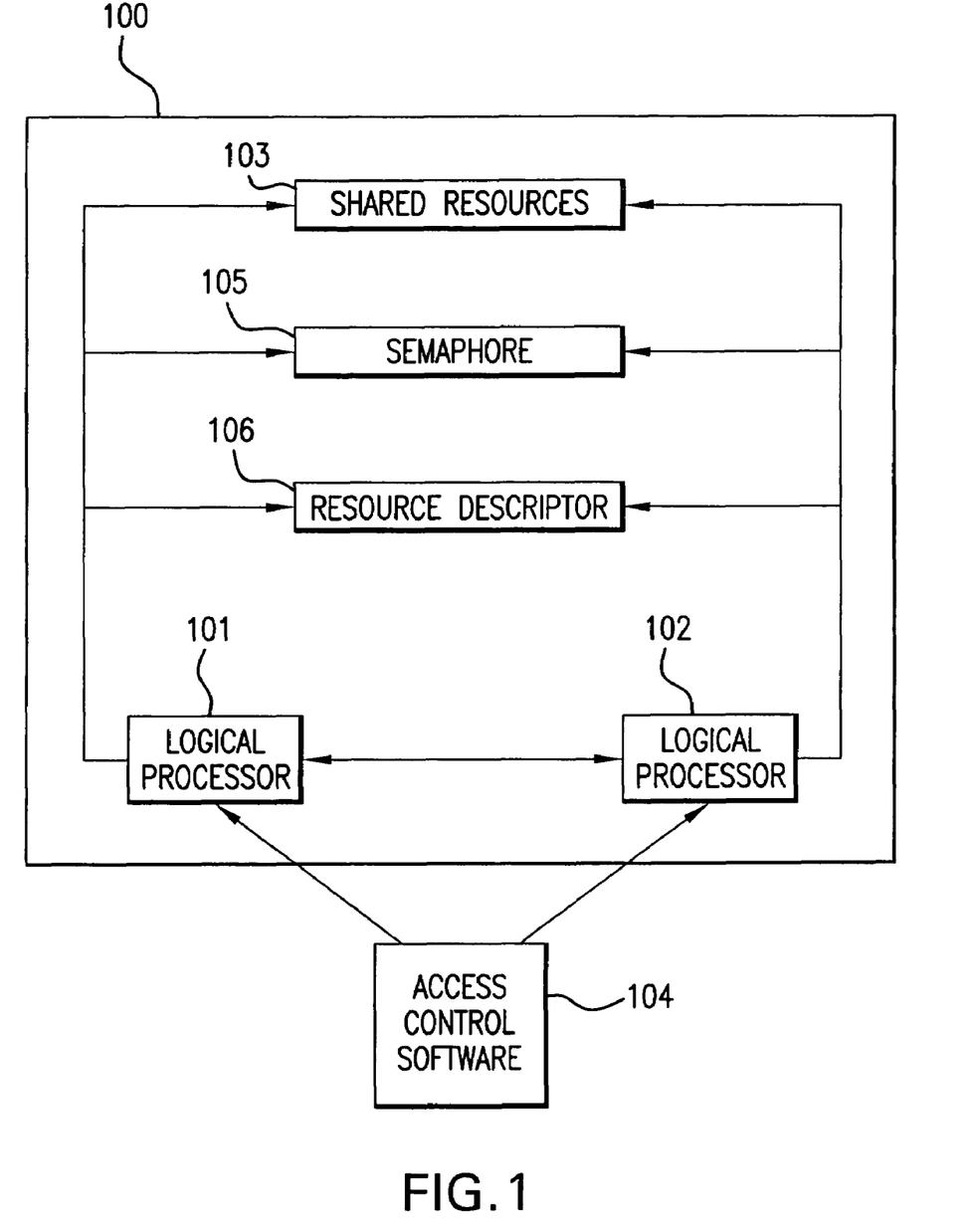
FIG. 1 is a block diagram of a logic device with two logical processors and access control software for controlling access by the two logical processors to shared resources of the device.

FIG. 1 is a block diagram illustrating elements in one possible embodiment of the invention. FIG. 1 shows a logic device 100 comprising integrated circuits and software. The device 100 could be, for example, a silicon microchip embodying semiconductor circuits.

In the example of FIG. 1, the device 100 includes two logical processors 101 and 102.

Logical processors 101 and 102 may each use shared resources 103. Accordingly, logical processors 101 and 102 may each execute access control software 104 for controlling access to the shared resources between the logical processors. In one embodiment, the access control software may be included in a firmware layer for interfacing between an operating system and chip hardware.

Logical processors 101 and 102 may communicate with semaphore 105 and resource descriptor 106. Semaphore 105 allows either logical processor 101 or 102 (but not both) to reserve exclusive access to resource descriptor 106. Resource descriptor 106 includes resource identifiers and information about resource availability, as described in more detail below. Semaphore 105 and resource descriptor 106 may both be registers, for example.

Figure 2:
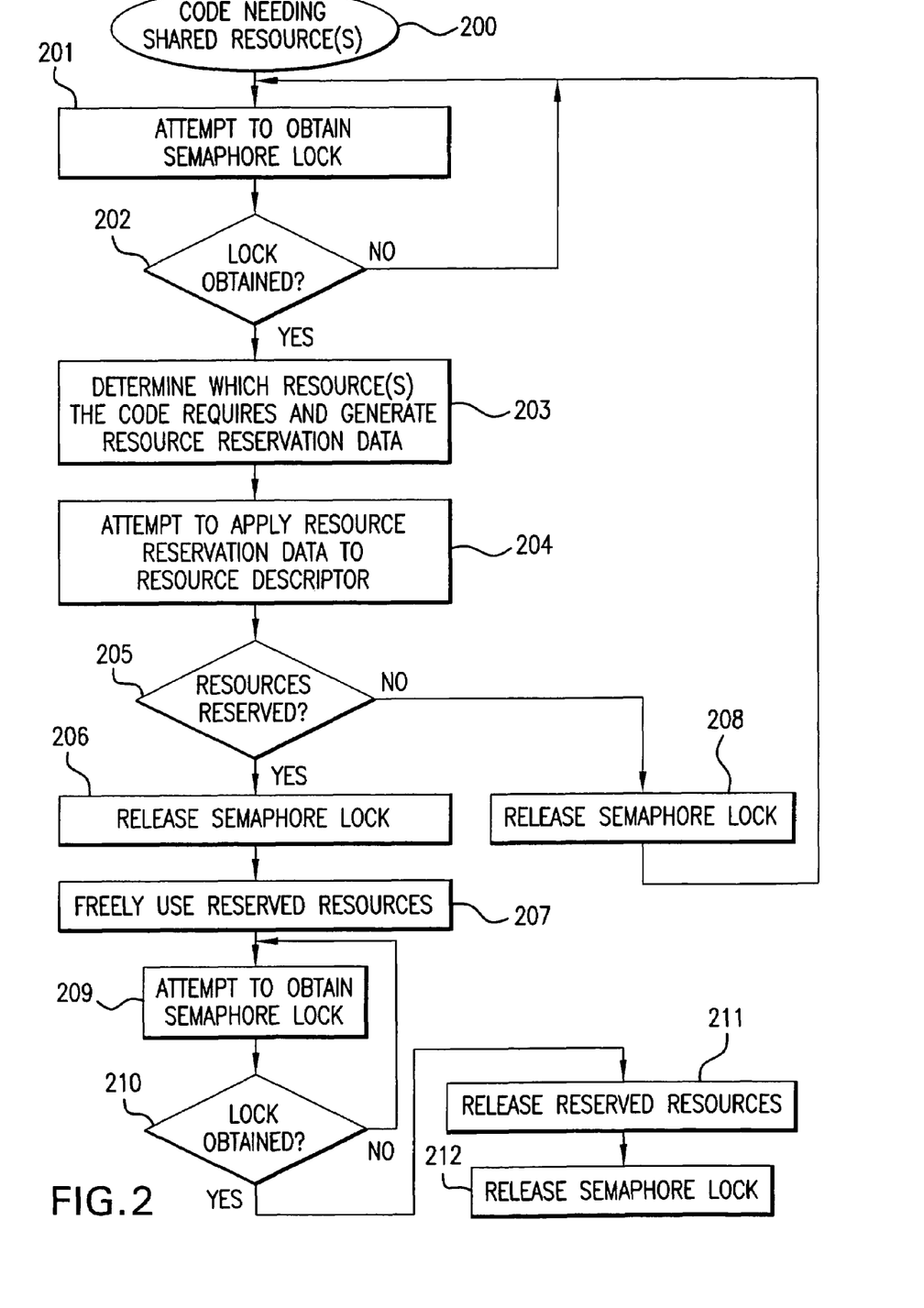
FIG. 2 is a flow diagram illustrating one possible embodiment of a process implemented by the access control software.

FIG. 2 illustrates a process flow for controlling access between logical processors 101 and 102 to shared resources 103 according to an embodiment of the invention. The flow represents operations by a single logical processor: i.e., it could describe operations by either logical processor 101 or logical processor 102, implemented by executing instructions of access control software 104. For purposes of illustration, however, the following discussion assumes that the process is performed by logical processor 101.

As shown in ellipse 200, the process may be initiated when code executed by logical processor 101 requires a resource or resources of shared resources 103. When this happens, logical processor 101 may attempt to obtain a semaphore lock on the resource descriptor 106 by updating semaphore 105, as shown in block 201. To obtain the semaphore lock, the logical processor may call a semaphore lock routine of the access control software and pass it the calling logical processor's identifier (i.e., logical processor 101) along with a lock value (e.g. a bit with a "1" value to set the lock) as parameters. The semaphore lock routine may write the logical processor's identifier and lock value into the semaphore register.

Whether logical processor 101 is able to obtain the semaphore lock may depend upon whether another logical processor (say, 102) already has the semaphore lock. If logical processor 102 already has the lock, logical processor 101 cannot obtain it. Thus, as shown in block 202, after attempting to obtain the lock, logical processor 101 may check to determine whether the lock was successfully obtained. If not, logical processor 101 may loop back to block 201 and try again until it successfully obtains a lock.

Figure 3:
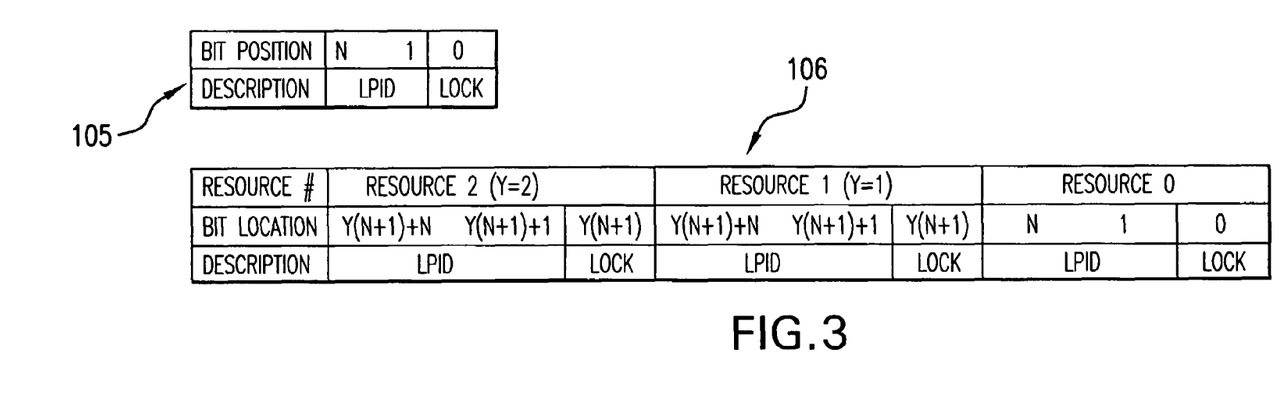
FIG. 3 shows details of a semaphore register and a resource descriptor according to an embodiment of the invention.

If logical processor 101 successfully obtains a lock, it has exclusive access to resource descriptor 106 (i.e., logical processor 102 is not permitted to change the contents of resource descriptor 106 while logical processor 101 has the lock). Accordingly, as shown in block 203, logical processor 101 may then determine which resource(s) it needs and generate resource reservation data, identifying the needed resource(s), to be applied to the resource descriptor. The resource reservation data, if successfully applied to the resource descriptor, reserves exclusive use of the identified resource(s). The resource reservation data may, for example, be in the form of a bitmap corresponding to the resource descriptor register (FIG. 3).

Next, as shown in block 204, logical processor 101 may attempt to apply the resource reservation data to the resource descriptor. To attempt to apply the reservation data, logical processor 101 may call a resource descriptor update routine of the access control software and pass it the calling logical processor's identifier and the reservation data identifying the needed resource(s). Whether logical processor 101 is able to successfully apply the resource reservation data to the resource descriptor may depend upon whether logical processor 102 already has reserved a resource or resources that logical processor 101 needs.

Thus, as shown in block 205, after attempting to reserve the resource(s) it needs, logical processor 101 may check to determine whether the attempt was successful.

Whether the attempt to obtain all necessary resources (block 205) is successful or unsuccessful, logical processor 101 may release the semaphore lock, as shown in blocks 206 and 208, thereby allowing logical processor 102 a turn at attempting to reserve any resource(s) it may need. To release the semaphore lock, the logical processor may call a semaphore lock release routine of the access control software and pass it the calling logical processor's identifier (logical processor 101) and lock value (e.g. a bit with a "0" value to reset or unlock the lock) as parameters.

If the attempt was not successful, logical processor 101 may, in effect, start over, releasing the semaphore lock as shown in block 208 and "getting back in line," by returning to block 201.

If the attempt was successful, on the other hand, logical processor 101 may freely use the reserved resource(s), as shown in block 207.

When logical processor 101 is finished using its reserved resources, the resource descriptor needs to be updated accordingly, so that logical processor 102 can use the resources that logical processor 101 was using if it needs to. Thus, logical processor 101 needs to obtain exclusive access to the resource descriptor, by obtaining a semaphore lock. Therefore, as shown in blocks 209 and 210, logical processor 101 may attempt to obtain the semaphore lock as described above with reference to blocks 201 and 202.

When the semaphore lock is obtained, logical processor 101 may release the resource(s) it reserved as shown in block 211. To release the resource(s), logical processor 101 may call a resource descriptor release routine similar to the resource descriptor update routine mentioned above. Of course, since logical processor 101 has the resource(s) reserved, there need not be any test, equivalent to block 205, as to whether logical processor 101 can release the resource(s).

As shown in block 212, logical processor 101 may then release the semaphore lock, allowing logical processor 102 to obtain the lock, if needed.

The foregoing description illustrates in detail how the invention allows for parallel use of shared resources by logical processors 101 and 102. Having once obtained the semaphore lock, whether or not logical processor 101 is able to reserve the resources it needs, it then releases the semaphore lock, allowing logical processor 102 to obtain the semaphore lock and attempt to reserve the resources that it needs. Thus, for example, if logical processor 101 needs resources A, B, and C, while logical processor 102 needs resources D, E, and F, both logical processors can reserve and use their respective resources concurrently.

Further, "thrashing" is eliminated because once a logical processor has the semaphore lock, no other logical processor can reserve resources. Thus, the availability of resources does not change while the logical processor holding the semaphore lock is attempting to reserve resources. And, the logical processor holding the semaphore lock can determine the availability of, and reserve the resources it needs by simply reading and updating the resource descriptor.

The foregoing process was described with reference to only two logical processors merely by way of example, in order to illustrate the principles of the invention. The device 100 could comprise, and the process would work, of course, with a number of logical processors greater than two.

FIG. 3 shows examples of possible embodiments of semaphore 105 and resource descriptor 106. Semaphore 105 could be an N+1-bit register, where N is the number of bits needed to encode the number of logical processors in the device 100. The low-order (0-th) bit position could be used for a lock bit as described above, while the 1st through N-th bits could contain a logical processor identifier. The register could be read/write (RW) shared.

Resource descriptor 106 could be a register formatted into a plurality of fields each associating a resource with a logical processor identifier (LPID) and a status identifier such as a lock bit. Each field associating a resource with a LPID and a status identifier could identify the corresponding resource based on the field's position, i.e., order, within the register. Each field could be N+1 bits long, with the low-order bit acting as the lock bit and the higher-order bits holding the LPID. Each resource's LPID field would identify which, if any, logical processor had reserved the resource, and the status identifier would indicate whether the reservation was currently active.

Figure 4:
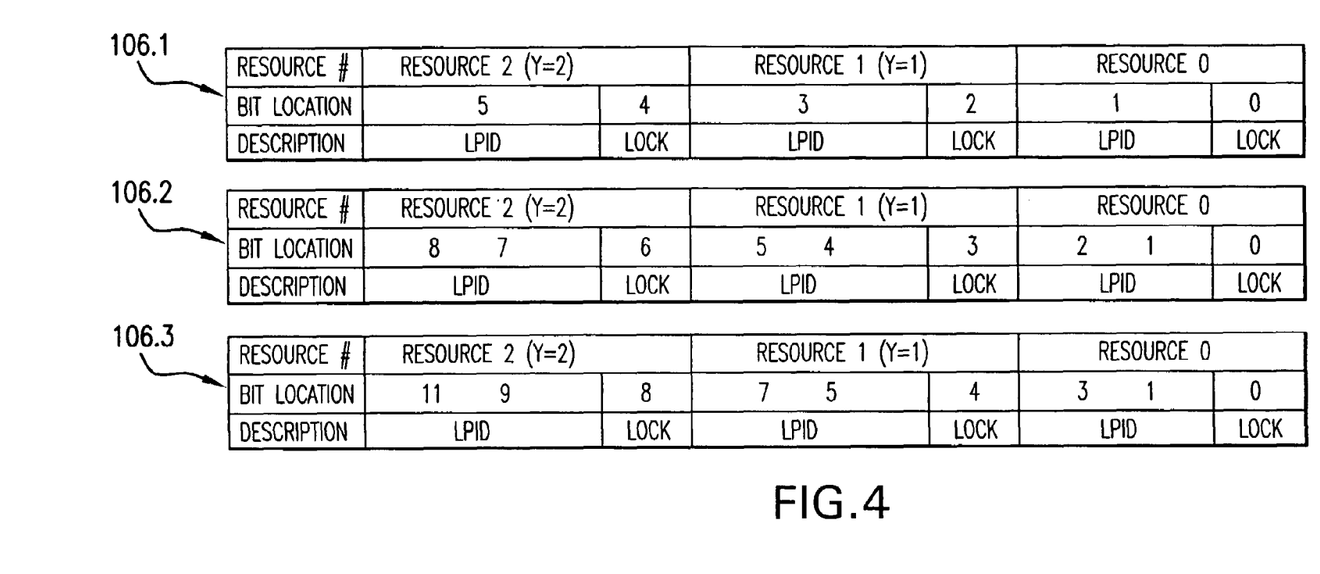
FIG. 4 shows more examples of the resource descriptor.

FIG. 4 shows three specific examples of resource descriptors 106.1, 106.2 and 106.3 for N=1, 2, 3, respectively.

As described above, a logical processor which successfully obtains a semaphore lock on the resource descriptor may generate resource reservation data in the form of a bitmap to be applied, if possible, to the resource descriptor to reserve exclusive use of the needed resource(s). Table 1, below, shows one possible format for the bitmap:

TABLE 1

| Bit Location: | M | ... | 6 | 5 | 4 | 3 | 2 | 1 | 0 |
|---|---|---|---|---|---|---|---|---|---|
| Resource: | Res M | ... | Res 6 | Res 5 | Res 4 | Res 3 | Res 2 | Res 1 | Res 0 |

(where M is the number of shared resources)

Thus, for example, in a device 100 with 10 shared resources, a logical processor needing resources 2, 5 and 8 might generate a bitmap as follows:

0100100100.

Figure 5:
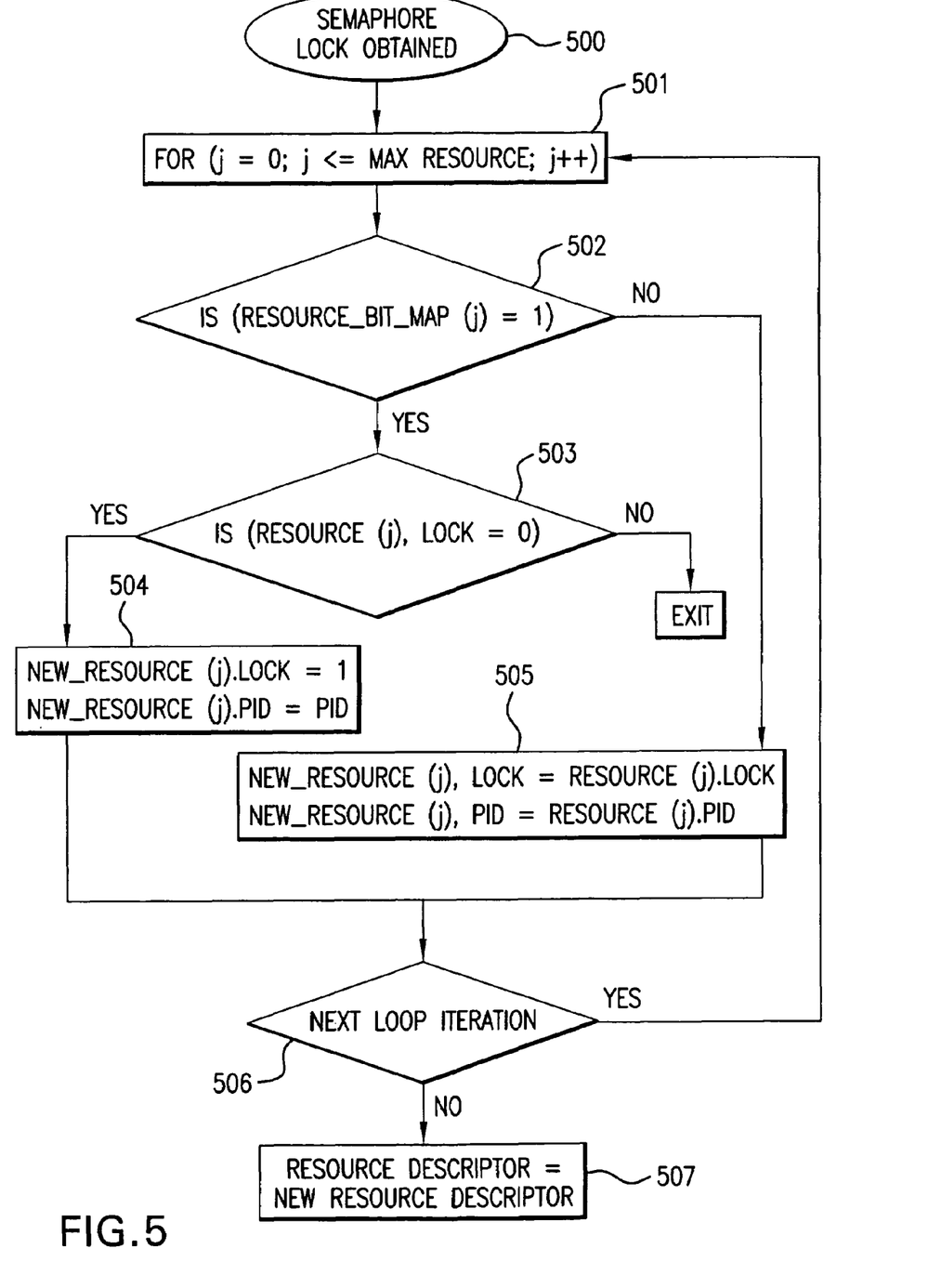
FIG. 5 is a flow diagram illustrating one possible embodiment of a resource descriptor update routine according to the invention.

As further described above, to attempt to apply the bitmap, the logical processor may call a resource descriptor update routine of the access control software and pass it the calling logical processor's identifier (LPID) and the bitmap identifying the needed resource(s). The resource descriptor update routine may generate a new resource descriptor based on the bitmap, calling LPID and the current resource descriptor, and write the new resource descriptor into the resource descriptor register. FIG. 5 shows a flow diagram for one possible embodiment of such a resource descriptor update routine.

As shown in ellipse 500, the routine may begin once the logical processor obtains the semaphore lock. Block 501 represents the establishment of an index, j, for stepping through the resources in the resource descriptor.

Block 502 shows testing a value of a bit in the bitmap, where "Resource_Bit_Map" is an arbitrary mnemonic assigned to the bitmap. If a bit has a "1" value, meaning that the logical processor needs to reserve the corresponding resource, the routine may progress to block 503. Otherwise, the routine may progress to block 505. Block 505 represents simply copying the current j-th resource descriptor field to the new j-th resource descriptor field.

Block 503 represents reading the current resource descriptor to test whether the resource required by the bitmap is already reserved. "Resource (j).LOCK" is an arbitrary mnemonic assigned to the current lock bit of the j-th resource. If the lock bit has a value of "0", the resource is available. Accordingly, the routine may branch to block 504. If, on the other hand, the requested resource is reserved, the routine may exit.

Block 504 represents generating a new field for the j-th resource of the new resource descriptor, where the new field is different from the current field. "New_Resource (j).LOCK" is an arbitrary mnemonic assigned to the lock bit of the new field. The update routine may set the lock bit to "1". "New_Resource (j).LPID" is an arbitrary mnemonic assigned to the LPID field of the new field. The routine may write the calling LPID to the new LPID field.

The routine may then progress to block 506 and the next loop iteration. If all the bits in the bitmap have been processed, the routine may then write the new resource descriptor to the resource descriptor register, as shown in block 507.

As discussed earlier, one of the problems that can occur in the use of semaphores is that a logical processor may fail while it has a lock on needed resources. This situation can be difficult to remedy because read/write access to the semaphore register is hardware-controlled, and only the locking logical processor is authorized to release the lock. In known systems, it is the logical processor hardware which supplies its LPID to the hardware which controls access to the semaphore in order to obtain the lock.

By contrast, in embodiments of the present invention, the access control software supplies the LPID to the hardware which controls access to the semaphore. That is, a logical processor seeking to obtain a semaphore lock calls a semaphore lock routine of the access control software and passes the routine its LPID and a lock value. Similarly, a logical processor seeking to release a lock calls a semaphore lock release routine of the access control software and passes the routine its LPID and a lock value. It is the semaphore lock routine or semaphore lock release routine that passes the LPID and lock value to the semaphore access control hardware.

Thus, because the LPID is being supplied by software rather than hardware, it is possible for a different logical processor to, in effect, masquerade as the failing logical processor in order to release the lock of the failing logical processor on the semaphore. That is, when a failing logical processor is detected and the failing logical processor has the semaphore lock, another logical processor can call the semaphore lock release routine and pass the routine the LPID of the failing logical processor. Since the "authorized" LPID has now been supplied, the semaphore can release the lock.

Figure 6:
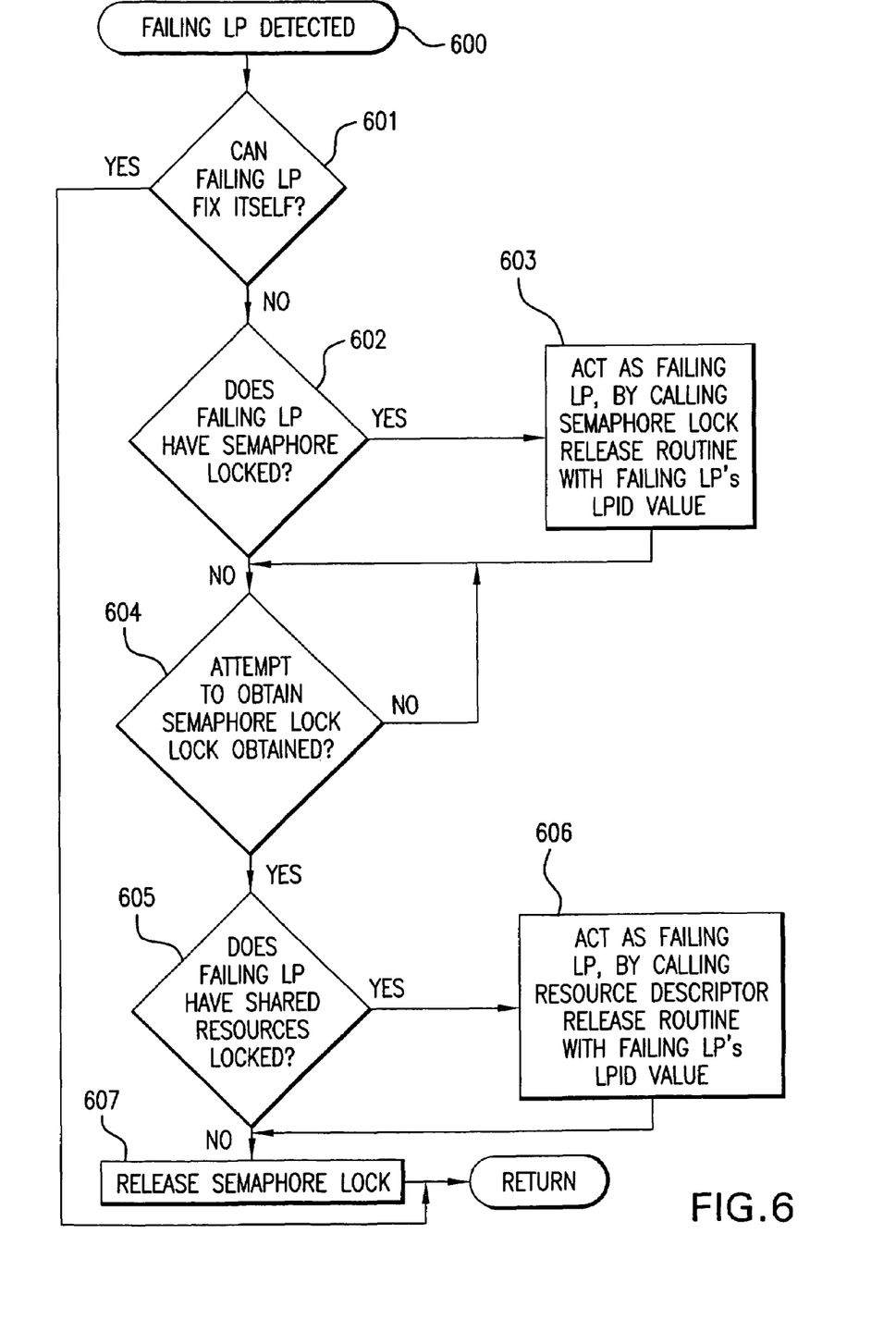
FIG. 6 is a flow diagram illustrating an embodiment of a routine for releasing a semaphore lock and reserved resources of a failing logical processor.

Embodiments are illustrated in FIG. 6. When a failing logical processor (LP) is detected (block 600), it may be determined whether the failing logical processor can fix itself, as shown in block 601. If so, the process may return directly (i.e., the resources locked by the failing logical processor will be freed up in the normal course of events).

If not, block 602 may be executed to determine whether the failing logical processor has the semaphore lock. If the failing logical processor has the semaphore lock, another logical processor may call the semaphore lock release routine and pass it the LPID of the failing logical processor, as shown in block 603. The semaphore lock release routine may pass the LPID of the failing logical processor to the semaphore access control hardware, along with a lock value of "0", thereby releasing the semaphore lock.

The process may then continue to block 604 and 605, where after obtaining the semaphore lock, it may be determined whether the failing logical processor has any resource(s) locked. If it does, another logical processor may call the resource descriptor release routine and pass it the LPID of the failing logical processor along with a bitmap setting the respective lock bits of the reserved resources to "0", as shown in block 606. All resources reserved by the failing logical processor will then have been released. The semaphore lock may then be released as shown in block 607, and the process may return.

Hardware on the device 100 may be configured to support the above-described software-implemented processes. For example, according to embodiments each logical processor on the device may include a register containing its LPID, which is readable by the access control software 104 to enable the access control software to identify which logical processor it is executing on. Further, logical processors on the device could have unrestricted read access to the semaphore and resource descriptor registers.

Additionally, upon an attempted write to the semaphore register 105 by a logical processor, the semaphore access control hardware could be configured to check the status of the lock bit of the semaphore register. If the lock bit is set, the hardware could compare the incoming LPID, passed to the semaphore access control hardware by the access control software, of the logical processor attempting the write with the current LPID in the semaphore register, and only allow the write if the two LPIDs were the same. As noted above, because the LPID is supplied by the access control software, there is the possibility of releasing a lock of a failing logical processor by supplying the failing logical processor's LPID to the hardware.

On the other hand, if the lock bit is not set, the semaphore access control hardware could allow a write to the semaphore register from any logical processor.

Further, if two or more logical processors were attempting to write to the semaphore register at the same time, device hardware could be configured to give priority to a write which was attempting to release the semaphore lock over writes attempting to obtain the lock. This should be done because the assumption is made in software that the write to release has succeeded.

Access control software comprising computer-executable instructions according to embodiments of the present invention may be stored and transported on a computer-usable medium such as diskette, magnetic tape, disk or CD-ROM. The instructions may be downloaded to another storage medium such as a ROM or RAM on device 100, from which they may be fetched and executed by logical processors of device 100 to effect the advantageous features of the invention.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method comprising:
    for a first logical processor, obtaining a lock on a semaphore controlling exclusive access to a resource descriptor, the resource descriptor describing a usage allocation of resources shared among a plurality of logical processors wherein the lock is obtained by a semaphore lock routine comprising writing an identifier of the logical processor and a lock value into a semaphore register;

obtaining exclusive access for said first logical processor to said resource descriptor if said lock is obtained;

determining which shared resources the first logical processor needs;

generating resource reservation data identifying the needed resource;

applying the resource reservation data to the resource descriptor;

querying said resource descriptor to determine whether resources needed by said first logical processor are available;

if resources needed by said first logical processor are available, updating said resource descriptor to reserve said resources for exclusive use by said first logical processor; and releasing, utilizing a semaphore lock release routine to pass the identifier of the logical processor and a lock value, said exclusive access for said first logical processor to said resource descriptor.

2. The method of claim 1, further comprising:
if said resources needed by said first logical processor are not available, releasing said exclusive access for said first logical processor to said resource descriptor.

3. The method of claim 1, further comprising, after the releasing, accessing a shared resource by said first logical processor.

4. The method of claim 1, further comprising:
after exclusive access for said first logical processor to said resource descriptor is released, obtaining exclusive access for a second logical processor to said resource descriptor;

querying said resource descriptor to determine whether resources needed by said second logical processor are available;

if resources needed by said second logical processor are available, updating said resource descriptor to reserve said resources for the exclusive use of said second logical processor; and releasing said exclusive access for said second logical processor to said resource descriptor.

5. The method of claim 4 further comprising:
if said resources needed by said second logical processor are not available, releasing said exclusive access for said second logical processor to said resource descriptor.

6. An apparatus comprising:
a plurality of logical processors to generate resource reservation data identifying a plurality of resources shared by said plurality of logical processors;

a resource descriptor to utilize said resource reservation data to identify a status of said shared resources; and a semaphore comprising a semaphore register to reserve exclusive access for one of said plurality of logical processors to said resource descriptor, wherein a semaphore lock routine writes an identifier of one of the plurality of logical processors and a lock value into the semaphore register, and the plurality of logical processors, the resource descriptor, and semaphore are configured to:

obtain a lock on the semaphore controlling exclusive access to the resource descriptor;

obtain exclusive access for a first logical processor of said plurality of logical processors to said resource descriptor if said lock is obtained;

determine which shared resources the first logical processor needs;

generate resource reservation data identifying the needed resource;

apply the resource reservation data to the resource descriptor;

query said resource descriptor to determine whether resources needed by said first logical processor are available;

if resources needed by said first logical processor are available, update said resource descriptor to reserve said resources for exclusive use by said first logical processor; and release, utilizing a semaphore lock release routine to pass the identifier of the logical processor and a lock value, said exclusive access for said first logical processor to said resource descriptor.

7. The apparatus of claim 6, further comprising logic to:
cause a first logical processor to update said semaphore to reserve exclusive access to said resource descriptor;

cause said first logical processor to update said resource descriptor to reserve exclusive use of at least a first resource of said shared resources; and subsequently cause said first logical processor to update said semaphore to release said exclusive access.

8. The apparatus of claim 7, said logic to further:
cause a second logical processor to update said semaphore to reserve exclusive access to said resource descriptor;

cause said second logical processor to update said resource descriptor to reserve exclusive use of at least a second resource of said shared resources; and subsequently cause said second logical processor to update said semaphore to release said exclusive access;
wherein after reserving exclusive use of said first and second resources, respectively, said first and second logical processors concurrently use said first and second resources, respectively.

9. A system comprising:
a plurality of logical processors to generate resource reservation data identifying;

a plurality of resources to be shared by said logical processors;

a resource descriptor utilize said resource reservation data to identify a status of said shared resources and to control access to said resources;

a semaphore register to reserve exclusive access for one of said plurality of logical processors to said resource descriptor to said resource descriptor, wherein a semaphore lock routine is to write an identifier of one of the plurality of logical processors and a lock value into the semaphore register; and access control logic to allocate one or more of said shared resources only when granted exclusive access to said resource descriptor by said semaphore register; and the plurality of logical processors, a plurality of resources, the resource descriptor, the semaphore register, and the access control logic are configured to:

obtain a lock on the semaphore controlling exclusive access to the resource descriptor;

obtain exclusive access for a first logical processor of said plurality of logical processors to said resource descriptor if said lock is obtained;

determine which shared resources the first logical processor needs;

generate resource reservation data identifying the needed resource;

apply the resource reservation data to the resource descriptor;

query said resource descriptor to determine whether resources needed by said first logical processor are available;

if resources needed by said first logical processor are available, update said resource descriptor to reserve said resources for exclusive use by said first logical processor; and release, utilizing a semaphore lock release routine to pass the identifier of the logical processor and a lock value, said exclusive access for said first logical processor to said resource descriptor.

10. The system of claim 9, wherein said resource descriptor includes a plurality of fields each to associate a resource with a logical processor identifier.

11. The system of claim 9, wherein said access control logic is to obtain a lock on said semaphore register to reserve exclusive access to said resource descriptor, determine whether a needed resource is available based on said resource descriptor, if so, reserve the resource, and release the lock on the semaphore register.

12. The system of claim 11, wherein said access control logic is further to reserve one or more resources by assigning a logical processor identifier to a corresponding resource.

13. A system comprising:

a plurality of logical processors;

a plurality of resources to be shared by said logical processors;

a resource descriptor to control access to said resources;

a semaphore register to reserve exclusive access for one of said plurality of logical processors to said resource descriptor; and access control logic to allocate one or more of said shared resources only when granted exclusive access to said resource descriptor by said semaphore register; and unlock logic to prevent a failing logical processor from retaining a lock on the semaphore register, wherein the unlock logic includes causing a logical processor different from the failing logical processor to call a semaphore lock release routine and pass the routine the identifier of the failing logical processor.

\* \* \* \* \*

UNITED STATES PATENT AND TRADEMARK OFFICE
CERTIFICATE OF CORRECTION

PATENT NO. : 7,428,732 B2  Page 1 of 1
APPLICATION NO. : 10/001961
DATED : September 23, 2008
INVENTOR(S) : Jason G. Sandri et al.

It is certified that error appears in the above-identified patent and that said Letters Patent is hereby corrected as shown below:

Column 10, Line 44, "a resource descriptor utilize"
should be --a resource descriptor to utilize--

Column 12, Line 21, "pass the routine the identifier"
should be --pass the routine identifier--

Signed and Sealed this

Twenty-third Day of November, 2010

David J. Kappos
*Director of the United States Patent and Trademark Office*